United States Patent [19]
Granberg

[11] 3,796,113
[45] Mar. 12, 1974

[54] DEPTH GAUGE ATTACHMENT

[76] Inventor: Elof Granberg, 201 Nevin Ave., San Rafael, Calif. 94801

[22] Filed: July 17, 1972

[21] Appl. No.: 272,322

[52] U.S. Cl............................ 76/74, 76/25 A, 76/37
[51] Int. Cl............................................. B23d 63/16
[58] Field of Search........................ 76/37, 25 A, 74

[56] References Cited
UNITED STATES PATENTS
3,354,753  11/1967  Kennemore............................. 76/37
3,338,116  8/1967  McLean............................. 76/25 A Primary Examiner—Leonidas Vlachos
Attorney, Agent, or Firm—Bruce & McCoy

[57] ABSTRACT

A depth gauge attachment for use with a motorized grinder for sharpening a saw chain. The gauge is removably fixed to the grinder with the rotating grinding element thereof extending beyond the gauge. The grinder may then be adapted to grind the cutter gauge of a saw chain tooth whereby the cutter gauge portion of each cutter link of a saw chain may be sequentially ground to substantially the same clearance.

8 Claims, 4 Drawing Figures

PATENTED MAR 12 1974  3,796,113

3,796,113

DEPTH GAUGE ATTACHMENT

CROSS REFERENCE TO RELATED APPLICATIONS

This application is related to applicant's copending U.S. Pat. application Ser. No. 156,859, filed June 25, 1971, for Grinding Apparatus and Method, now U.S. Pat. No. 3,738,200.

BACKGROUND OF THE INVENTION

1. Field of the Invention

This application relates generally to rotary grinders for sharpening the cutter links of a saw chain, and more particularly, to a depth gauge attachment for use with a motorized sharpener whereby the cutter gauge of each saw chain tooth may be progressively ground to change the clearance of the cutting portion of the tooth.

2. Description of the Prior Art

Generally, each cutter link of a saw chain is provided with a cutter gauge at the front of the link and a cutting portion at the rear end. Applicant's copending U.S. Pat. Application Ser. No. 156,859, discloses a rotary grinder sharpening means for sharpening the cutting portion of a cutter link of a saw chain.

As a chain saw is used, the cutter links lose their sharpness and wear down. In addition, when the same chain saw is used for cutting different types of wood, the bite or amount of wood taken on each cut of the chain saw may vary considerably, depending on the hardness of the wood being cut. Therefore, in presently available saw chains, the cutter gauge portion of the link is machined to a predetermined height to control the bite or amount of wood taken by each pass of a cutter link. To modify this cutter gauge for use with different hardness of woods, or to take into account the wearing of the cutting portion of the tooth, the cutter gauge portion is normally filed by hand. Accuracy in filing each cutter gauge by hand is rarely, if ever achieved. As a result, there exists a need for a means for accurately taking the same amount of material off each cutter gauge portion of the links of a saw chain. Such a means will decrease the overall wear of the saw chain by insuring that each link takes the same cut or bite during each pass through the wood being sawed.

The present invention provides a cutter gauge attachment for use with a motor driven saw chain sharpening means which permits the saw chain sharpening means to grind or remove the same amount of material from each cutter gauge of the separate cutter links of a saw chain.

SUMMARY OF THE INVENTION

A depth gauge attachment for a saw chain sharpener having a grinding element. The attachment comprises a plate capable of being removably secured to a sharpener over the grinding element. The plate includes a flat portion having an opening formed therein through which a portion of the grinding element extends whereby when the grinder is placed on a chain saw bridging a pair of adjacent links, the plate may be adjusted with respect to the sharpener to enable the depth gauge of the cutting link over which the grinding element is held to be ground to a predetermined height.

OBJECTS OF THE INVENTION

It is therefore an important object of the invention to provide a depth gauge attachment which may be removably secured to a motorized grinder for grinding the cutter gauge of a cutter link of a saw chain.

It is a further object of the present invention to provide a depth gauge attachment for a grinder which may be adjusted with respect to the grinder to permit varying the amount the depth gauge is machined.

It is another object of the instant invention to provide a tapered portion on a depth gauge attachment for a grinder for causing the grinding element to be moved longitudinally across the top of a cutter gauge when the tapered edge is held against a fixed surface while the grinder is moved laterally across the cutter gauge.

DESCRIPTION OF THE PREFERRED EMBODIMENT

The present invention is a depth gauge attachment for use with a saw chain grinder of the type disclosed in applicant's copending U.S. application Ser. No. 156,859. With the depth gauge of the present invention attached to the frame of the saw chain sharpener of application Ser. No. 156,859, the grinding element thereof may be used to sequentially grind the cutter gauge of each cutter link to a predetermined height.

Figure 1:
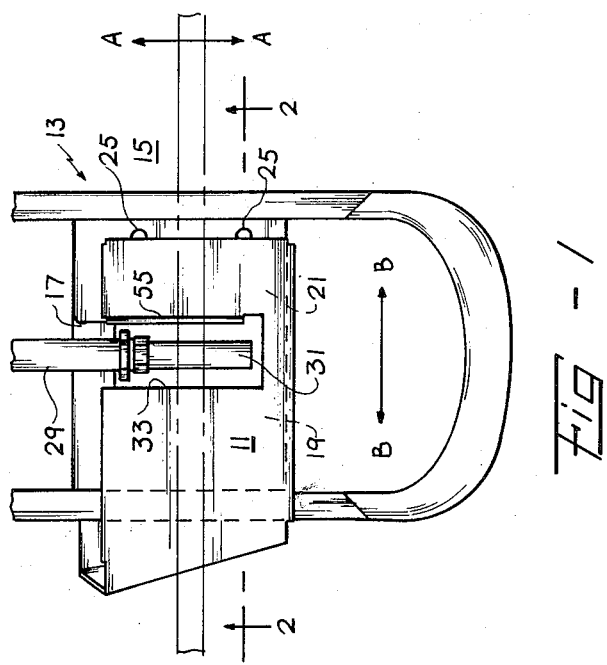
FIG. 1 is a bottom plan view of a portion of the frame of a motorized grinder for sharpening a saw chain having the depth gauge attachment of the present invention secured thereto.

Turning now to the drawings, FIG. 1 shows a preferred embodiment of a depth gauge attachment 11 of the instant invention removably secured to a frame 13 of a sharpener. Frame 13 is preferably a unitary element having an electrical motor (not shown) nested within an open central portion thereof.

A cross member 15 having indicating means for aligning or holding the grinder at the proper sharpening angle with respect to a saw chain cutting link or tooth is provided within the frame 13. This cross member includes a pair of side braces 17 having a pair of web plates 19, 21 fixed therebetween. The plates preferably stop short of a central portion of the cross member to provide an opening 23 between the ends of the web plates.

One of the plates, preferrably plate 19, includes a pair of holes 25 which may be bottomed within the plate or pass completely therethrough. These holes also pass through an adjustment plate means 27 fixed to the frame for pivotal movement with respect thereto.

Figure 3:
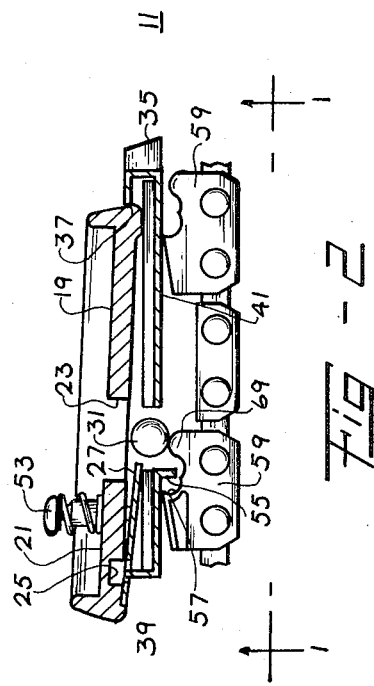
FIG. 3 is a top elevational view of the depth gauge of the present invention.
Figure 4:
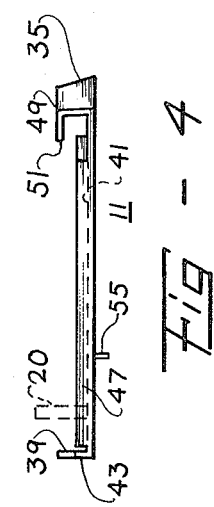
FIG. 4 is a side elevational view of the depth gauge of FIG. 3.

If the frame 13 is formed with only one side plate, the attachment 11 may be provided with a stud 20 (shown in phantom line in FIGS. 2, 3 and 4) on the appropriate side thereof which is secured to the plate in any convenient manner such as be welding. This stud is preferably threaded and passes through an opening (not shown) formed in the frame plate and includes a fastening means, such as a nut, for securing the gauge to the frame. The depth gauge attachment may be made adjustable with respect to the frame of the grinder to allow the positions of the attachment to be adjusted with respect to the grinding element 31 of the saw chain sharpener.

The electrical motor nested within the frame 13 includes a drive shaft 29 extending outwardly therefrom toward the cross member 15. The drive shaft preferably includes a removable hollow insert, described more clearly in applicant's copending application, having a threaded inner portion into which the threaded end of the grinding element 31 may be engaged.

As shown, the grinding element extends outwardly over the space 23 between the plates 19, 21 and into an opening 33 formed within the depth gauge attachment 11. The depth gauge attachment is secured to the bottom portion of the frame 13 by catching or hooking one end 35 of the depth gauge over a ridge 37 formed on the side of the frame. Ears or tabs 39 formed on the opposite end of the depth gauge attachment are then lined up with the holes 25 in the cross members and rotated into the same to firmly seat or snap the gauge into position on the frame.

The preferred embodiment of the depth gauge attachment comprises a flat bottom or plate portion 41, made from a stiff material, such as a metal or the like. The plate portion is preferably a four sided elongated plate having two ends 35, 43 and two long sides 45, 47. As shown, one of the short sides, namely 35, angularly extends between the long sides. This angled side is formed with a folded-over end portion 49 for hooking onto or over the ridge 37 on the grinder frame. The folded-over end portion 49 extends away from the upturned edge portion so as to rest substantially parallel to the flat plate 41. The inner edge 51 of this folded over portion is preferably formed so as to extend substantially parallel to the other short side 43.

The other or second short side 43 of the plate is square and also includes an upturned edge portion extending in the same direction and approximately one-half the height of the upturned edge portion on the first short side 35. This upturned edge portion includes the pair of tabs 39 which extend upwardly therefrom, for substantially the same distance as the upturned edge portion of side 35.

When the flat inner edge 51 is placed over the ridge 37 formed on the frame 13, and the plate rotated, the ears or tabs 39, extending from the upturned edge of the other short side 43 will be moved into the holes 25, to enable the depth gauge attachment to be held firmly in position.

The opening 33 is formed in the flat plate portion 41 of the attachment at a predetermined position whereby when the plate is mounted on the frame, the opening will be aligned with the grinding bit 31. In this position, an adjustment screw 53 may be turned to adjust the pivoting plate 27 to thereby adjust the depth gauge attachement with respect to the frame of the grinder. This adjustment of the gauge will vary the amount the grinding element extends beyond or through the opening 33.

The long sides 45, 47 of the plate are also provided with upturned edge portions, extending outwardly in the same direction for substantially the same distance as the upturned edge portion of the side 43. The opening 33 is provided with a down turned guard portion 55, extending substantially perpendicular thereto in the direction opposite to the upturned edge portions of the plate. The guard portion 55 acts to guard the cutting portion of a cutter link when the grinder having the depth gauge attachment fixed thereto is placed on a saw chain bridging two cutter links.

Figure 2:
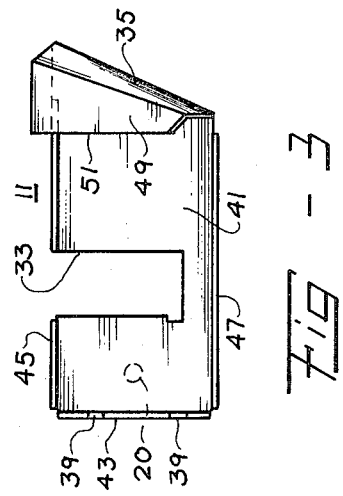
FIG. 2 is a cross sectional view showing the depth gauge attachment bridging two adjacent cutter links in a saw chain with the grinding element over the cutter or depth gauge of a cutter link to be ground.

As shown most clearly in FIG. 2, with the depth gauge attachment mounted on the grinder and resting or bridging two cutter links 57 of a saw chain, the bottom of the plate 41 is brought to rest against the top of the two alternating links with the tooth guard 55 extending into a link between the grinding element and a cutter edge 59 on the link and the depth gauge 61 thereof. The screw 53 of the plate is then adjusted downwardly so that the pivotable plate 27 presses against the depth gauge attachment until the bottom of the gauge attachment is substantially flush with the outer portion of the grinding element.

The screw 53 is then backed off, a given number of turns, depending on the pitch of the screw thread, and the size of the adjustment plate. In a preferred embodiment of applicant's invention, the screw is provided with a hexagonal head having sides which are 0.005 foot wide. The pitch and the contact point with the adjustable plate are such that one complete turn of the screw, in a backed-off direction, will expose the grinding wheel 0.030 inch. In this manner, if it is desired to expose more of the grinding element, each 1/6 of a turn of the screw will add an additional 0.005 inch.

When the desired adjustment is made, the grinding wheel is placed directly over one of the cutter gauges 61. The saw chain is then gripped with one of the hands of the user, and the tapered end portion 35 of the attachment is placed against one of the fingers, such as the thumb, of the user's other hand. The grinder is then started and moved laterally or perpendicularly (direction A—A) to the chain back and forth over the saw chain. The tapered or angled portion of side 35 resting against the finger of the user will provide a slight longitudinal (direction B—B) motion to the grinder. In this manner, the entire top area of the cutter depth gauge may be ground off to the adjusted height. The entire grinder is then moved to a further tooth so as to sequentially or successively grind all of the cutter gauges of a saw chain to the desired clearance depth.

It therefore can be seen that an important feature of the present invention is the provision of a depth gauge attachment which may be easily attached to or removed from presently available saw chain sharpeners. The grinder may then be used to sequentially grind all the cutter gauges to a predetermined set clearance to provide more uniform cutting performance by each of the saw chain teeth.

Obviously, many modifications and variations of the present invention are possible in light of the above teachings. It is therefore to be understood that within the scope of the appended claims, the invention may be practiced other than as specially described.

I claim:

1. A depth gauge attachment for use with a motorized saw chain sharpener having a grinding element for machining the cutter gauge of a saw chain link, the attachment comprising:

a plate removably secured to said sharpener and including a flat portion having an opening formed therein through which a portion of the grinding element extends, a guard formed by a portion extending substantially perpendicularly from said plate adjacent said opening, whereby, when said flat portion of said plate is placed on a saw chain bridging two links, said grinding element will engage the top surface of the cutter gauge of one of said links to a predetermined depth and said guard will extend into an opening in said link between said grinding element and the cutting edge of the link being ground to prevent the grinding element from hitting said cutting edge.

2. The depth gauge attachment of claim 1 wherein said plate is adjustable with respect to said saw chain sharpener to change the amount of grinding element which extends through said opening.

3. The depth gauge attachment of claim 2 wherein said plate includes a stud fixed to one side thereof for securing said attachment to the sharpener, and said saw chain sharpener includes adjustable means to change the amount of grinding element which extends through said opening.

4. The depth gauge attachment of claim 2 wherein said saw chain sharpener includes a frame having a cross member bracketing the sides and end of the grinding element and forming an opening through which the grinding element extends and over which said plate is mounted, said plate including upturned edge portions extending in the direction opposite from said plate than said guard portion and engaging said cross member in such a manner that said attachment is spaced a predetermined distance from said cross member.

5. A depth gauge attachment for use with a motorized saw chain sharpener having a frame including a crossmember bracketing the sides and end of a grinding element, and forming an opening through which said grinding element extends, for machining the cutter gauge of a saw chain link, the attachment comprising:

a plate removably mounted over said frame crossmember opening and having a flat portion with an opening formed therein through which a portion of the grinding element extends, the ends of said plate being formed to engage the frame of said grinder in an adjustable spaced relation in order to change the amount of grinding element which extends through said flat portion opening, said plate ends including edge portions, one of said edge portions including a pair of tabs extending substantially perpendicularly from said plate for engaging a pair of holes formed in the crossmember, and the other edge portion including a folded over end portion means extending from said plate for hooking onto the frame of the chain saw sharpener and thereby fixing said plate to said sharpener at a predetermined distance from said crossmember when said tabs are fitted into the holes of said crossmember, and a guard formed by a portion adjacent the flat portion opening extending substantially perpendicularly from said plate in the direction opposite from said end edge portions, whereby, where said flat portion is placed on a saw chain bridging two links during grinding of the top of the cutter gauge of one of said links, said guard will extend into an opening in said link between said grinding element and the cutting edge of the link being ground to prevent the grinding element from hitting said cutting edge.

6. The depth gauge attachment of claim 5 wherein said cross member includes an adjustment means for changing the spacing of said depth gauge attachment with respect to the frame of said sharpener to in turn change the amount the grinding element extends through the opening of said plate.

7. The depth gauge attachment of claim 6 wherein said adjustment means includes a pivotable plate secured to said frame which can be adjustably pivoted outwardly from said frame between said frame and said plate to hold said plate away from said frame.

8. The depth gauge attachment of claim 5 wherein said folded over end portion forms an edge angled with respect to said grinding element whereby as said grinder is moved perpendicularly to the depth gauge portion being machined with said tapered portion coacting with a fixed surface said depth gauge attachment and grinder will be caused to move longitudinally across the top of the cutter gauge being ground.

* * * * *